United States Patent [19]

Cox et al.

[11] Patent Number: 4,813,003
[45] Date of Patent: Mar. 14, 1989

[54] METHOD OF DETECTING HOT SPOTS IN A ROTARY HEAT EXCHANGER

[75] Inventors: William C. Cox; Gary C. Goetschius; Mark T. Casagrande, all of Wellsville, N.Y.

[73] Assignee: Air Preheater Company, Inc., Wellsville, N.Y.

[21] Appl. No.: 877,034

[22] Filed: Jun. 23, 1986

[51] Int. Cl.$^4$ .............................................. G01J 5/00
[52] U.S. Cl. .................................... 364/557; 165/11.1; 250/338.3; 374/124
[58] Field of Search ............... 165/11.1; 250/338, 342, 250/349, 338.3; 364/550, 557; 374/120, 121, 124, 137

[56] References Cited

U.S. PATENT DOCUMENTS

| | | | |
|---|---|---|---|
| 3,730,259 | 5/1973 | Wixson et al. | 165/11.1 X |
| 3,854,336 | 12/1974 | Bibby | 374/124 |
| 3,861,458 | 1/1975 | Ostrander et al. | 165/11.1 X |
| 3,975,137 | 8/1976 | Hapgood | 431/79 |
| 4,022,270 | 5/1977 | Stockman | 165/11.1 X |
| 4,099,165 | 7/1978 | Botnen | 165/11.1 X |
| 4,192,372 | 3/1980 | Bellows | 165/11.1 X |
| 4,383,572 | 5/1983 | Bellows | 165/11.1 X |
| 4,480,537 | 11/1984 | Agronin et al. | 100/38 |

FOREIGN PATENT DOCUMENTS

| | | |
|---|---|---|
| 1577961 | 8/1969 | France. |
| 537578 | 10/1971 | Switzerland. |
| 1126466 | 9/1968 | United Kingdom. |
| 2118715 | 11/1983 | United Kingdom. |

Primary Examiner—Parshotam S. Lall
Assistant Examiner—Edward R. Cosimano
Attorney, Agent, or Firm—Combustion Engineering

[57] ABSTRACT

A detector (32) monitors infrared ray emissions from an air preheater (10) rotor (14) to detect a temperature rise that precedes a fire within air preheater (10) with each sensor output being processed independently by signal processing electronics. The instantaneous minus the average temperature of rotor (14) is calculated and compared to a variable trip level signal to determine whether a hot spot has been detected. The detector (32) scans across the face of rotor (14) until an initial hot spot is detected, whereupon the scanner motor (58) ceases operation thereby locating the scanner over the rotor radial position of the detected hot spot. If the same hot spot is detected on the next subsequent rotor pass, a hot spot alarm (60) is energized. If the hot spot is not detected on the next subsequent rotor pass, detector scanning is resumed by energizing scan motor (58).

25 Claims, 3 Drawing Sheets

METHOD OF DETECTING HOT SPOTS IN A ROTARY HEAT EXCHANGER

BACKGROUND OF THE INVENTION

This invention relates to rotary regenerative heat exchangers and more particularly to detecting hot spots in rotary regenerative heat exchangers before the element ignites.

In a rotary regenerative heat exchanger, a mass of heat absorbent material commonly comprised of packed element plates is positioned in a hot exhaust gas passageway to absorb heat from the hot gasses passing therethrough. After the plates become heated by the gas they are positioned in a passageway being traversed by cool air where heat is transferred from the heated plates to the cool air or gas flowing therethrough.

The heat containing gasses are typically the exhaust gas from a combustion process. As the hot exhaust gasses are directed through the rotary regenerative heat exchanger, fly ash and unburned products of combustion carried by the exhaust gas are deposited on the surface of the packed element plates. The deposits continue to build up until air and gas flow through the heat exchanger is reduced at least in the region of the build-up. When the temperature is elevated to the ignition point of the deposit heat is then generated until the deposits begin to glow and cause a "hot spot", that if not detected will rapidly increase in temperature until the metal of the heat exchanger will itself ignite and cause a fire. U.S. Pat. Nos.: 3,730,259; 3,861,458; 4,022,270; and 4,383,572, the disclosure of each being hereby incorporated by reference, disclose apparatus to detect hot spots in the packed element plates of a rotary regenerative heat exchanger including multiple elements and the cleaning of the lens of each element.

Typical prior art hot spot detectors rely on a single pass of the hot spot within the rotary regenerative air heater past a sensor to detect a hot spot. Furthermore, the signal produced by each of the plurality of sensors has been combined and processed as a single signal to detect a hot spot. Prior art hot spot detection systems typically use a predetermined fixed temperature as the threshold above which a measured temperature is considered to be a hot spot.

SUMMARY OF THE INVENTION

The present invention provides a system for detecting hot spots in a rotary regenerative heat exchanger. In accordance with the present invention, the end of the rotor of a rotary generative heat exchanger is scanned by one or more sensors as the rotor turns. The sensors are moved in an arcuate path such that over time as the rotor rotates and the sensors move through their respective arcuate paths, the entire surface area of the end of the rotary regenerative heat exchanger is scanned. The output of each sensor is processed by a separate signal processing circuit that may be substantially identical to the signal processing circuits processing the signals generated by the other sensors. An average rotor temperature is calculated by each signal processing circuit such as by integrating the temperature detected by a sensor over one revolution of the rotary regenerative air heater and dividing the integrated sum by the time period of one revolution. The average rotor temperature is summed with an adjustable, predetermined trip level set point resulting in a variable trip level signal for that sensor. The instantaneous rotor temperature detected by the corresponding sensor is compared to the variable trip level signal to determine when a hot spot is detected. When the instantaneous rotor temperature exceeds the variable trip level signal the sensor scanning drive de-energizes thereby maintaining the radial position of the sensor stationary. If within approximately one period of rotor revolution, the hot spot is again detected by the same sensor, a hot spot alarm is activated. If after an initial hot spot is detected, the sensor and processing circuitry do not detect the same hot spot within approximately one period of revolution of the rotor, the sensor scanning drive is reenergized to continue operation.

In this manner, the signal produced by each infrared sensor is processed by individual signal processing circuitry, the trip level signal varies permitting the hot spot detection system to track the heater temperature through start-up and shut-down when hot spots are likely to develop thereby enabling the hot spot detection system to detect hot spots at lower temperatures during transient temperatures. Furthermore, nuisance trips are minimized as the hot spot detection system must detect the same hot spot in two successive passes of the rotary regenerative heat exchanger.

DESCRIPTION OF THE PREFERRED EMBODIMENT

Figure 2:
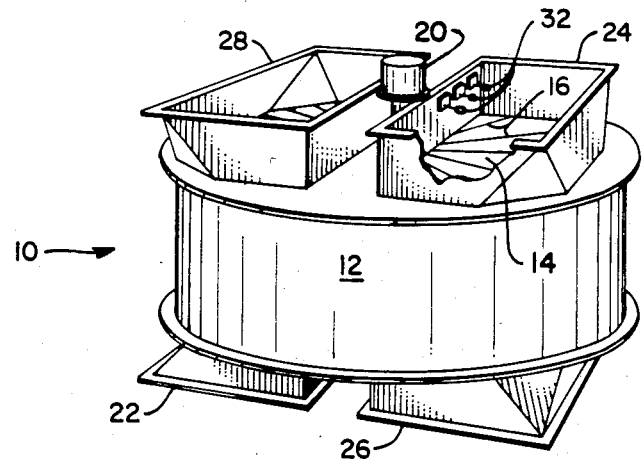
FIG. 2 is a perspective view of a rotary regenerative heat exchanger employing a plurality of sensors.

Referring to the drawing, initially to FIG. 2, there is depicted therein a rotary regenerative air preheater 10 having a hot spot detection system designed in accordance with the present invention. The rotary regenerative air preheater 10 is comprised of a cylindrical housing 12 that encloses rotor 14 having a cylindrical casing that includes a series of compartments formed by radial partitions 16 extending between the casing and a central rotor post. The compartments each contain a mass of heat absorbent material, such as corrugated element plates, that provide passageways for the flow of fluid therebetween. Rotor 14 is rotated slowly about its axis by motor 20 to advance heat absorbent material 18 comprising rotor 14 alternately between a heating fluid and a fluid to be heated. Heat absorbent material 18 absorbs heat from a heating fluid entering duct 22 of air preheater 10 and then transfers the absorbed heat to a cooler fluid entering air preheater 10 through duct 24. After passing over heat absorbent material 18 and absorbing heat therefrom, the heated fluid is discharged from air preheater 10 through duct 26 and transported to a point of use while the cooled heating fluid is discharged through duct 28.

Figure 3:
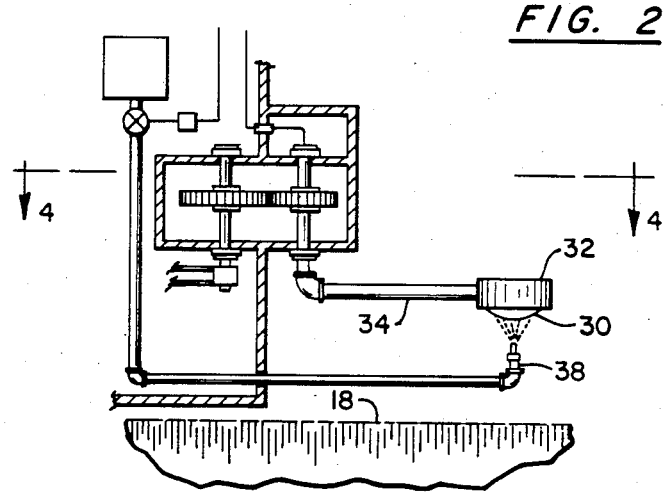
FIG. 3 is an enlarged sectional view showing a heat sensor positioned to receive infrared radiation from the packed element plates.

Instruments have been developed to detect the radiation of infrared rays from heat absorbent material 18 for detecting incipient fires and for initiating fire control measures within rotor 14 of air preheater 10. The infrared energy emitted by heat absorbent material 18 is collimated in some degree normal to the end surface of rotor 14. With reference to FIG. 3, the emitted infrared radiation that is collimated is focused by lens 30 onto sensor 32. Sensor 32, typically a lead sulfide chip which has a resistance that decreases as the amount of infrared energy increases, generates a signal proportional to the infrared radiation incident thereon. The signal generated by sensor 32 is indicative of the temperature of heat absorbent material 18 in the region of rotor 14 where the infrared energy originated.

Sensors 32 for the detection of infrared radiation emitted from heat absorbent material 18 are typically located in the air inlet duct of 24 through which the cooler fluid entering air preheater 10 passes. The sensors are typically positioned to scan an arcuate path in a plane parallel to and adjacent the end of rotor 14 in the cleanest and coolest environment. At this location, any ignited deposits creating hot spots will have had maximum exposure to air and hence oxygen thereby resulting in a hot spot at its maximum temperature.

One or more sensor heads traverse duct 24 in a plane parallel and adjacent to the end of rotor 14 so that the entire surface of the end face of rotor 14 is viewed as rotor 14 rotates through duct 24. Although the sensor head may be reciprocated in and out of the rotor shell so as to translate across duct 24, it is most common in the art to pivot the sensor heads 32 so that viewing lens 30 moves along an arcuate path as best illustrated in FIG. 4.

Figure 4:
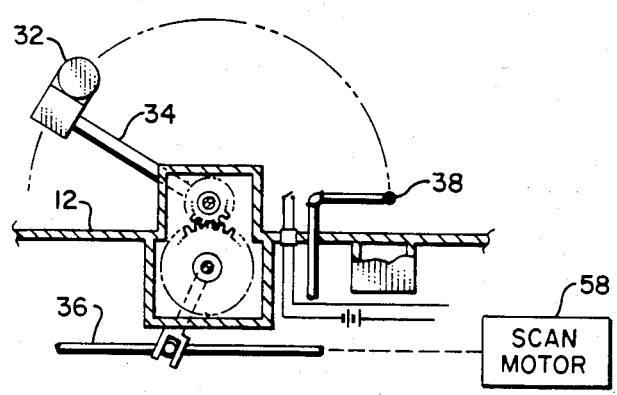
FIG. 4 is a top plan view showing the arcuate path of the heat sensor, taken along the line 4—4 in FIG. 3.

As illustrated in FIGS. 3 and 4, arms 34 are arcuately moved by apparatus such as reciprocating driving arm 36 rotating conventional gearing that in turn pivots arm 34 carrying sensor 32. The scan motor 58 used to actuate arm 34 is not germane to the invention. It is only necessary that the scan motor 58 actuation can be terminated so as to maintain stationary the radial position of sensor 32 relative to rotor 14.

In order to maintain viewing lens 30 at or near its peak of light transmission capability, viewing lens 30 is periodically subjected to a cleaning process that removes deposits of dust therefrom. One such cleaning system is disclosed in U.S. Pat. No. 4,383,572 in which a blast of pressurized cleaning fluid is timed to eject from nozzle 38 over viewing lens 30 as viewing lens 30 comes into direct alignment with nozzle 38. Other lens cleaning processes may be used.

Figure 1:
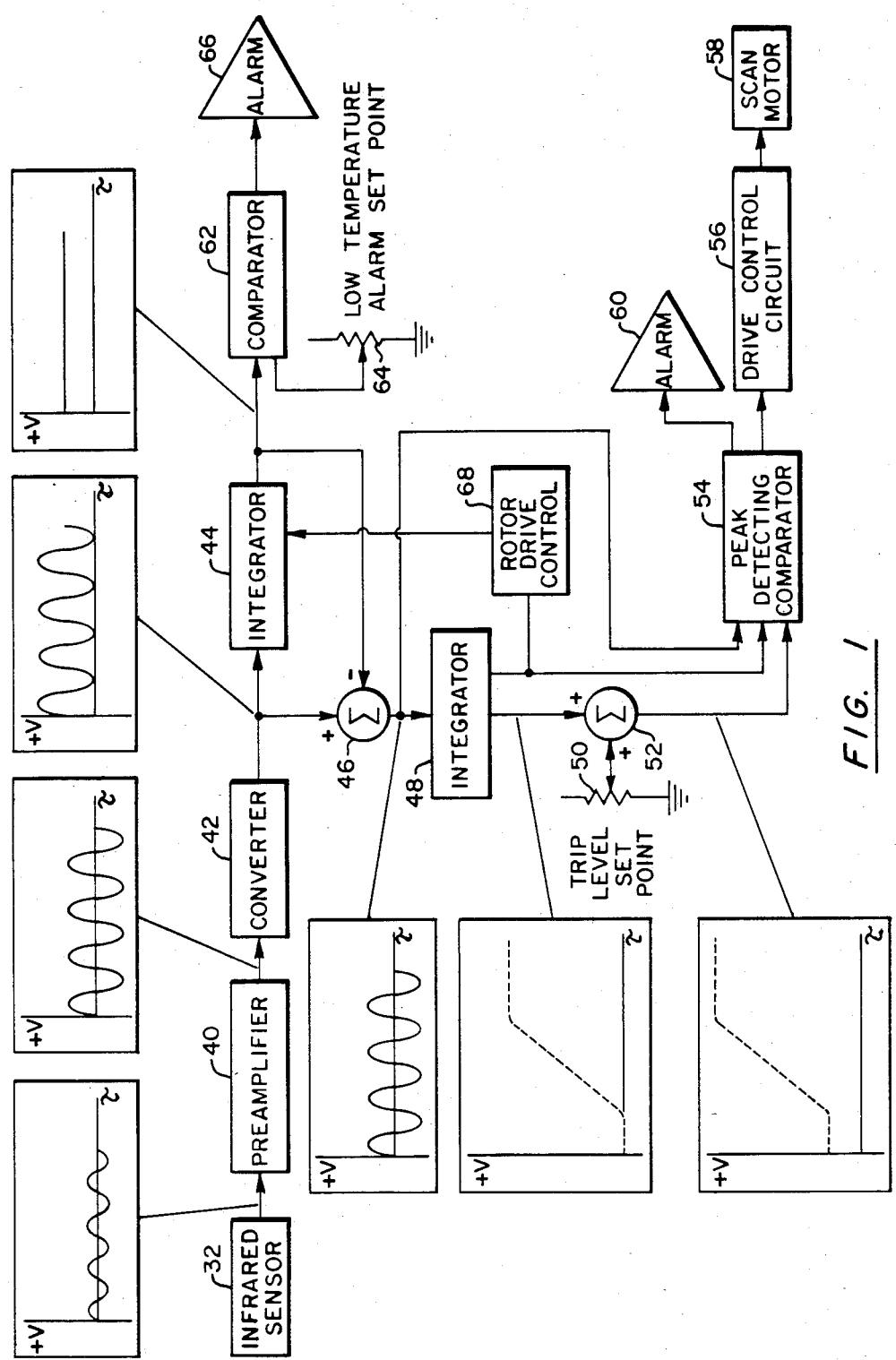
FIG. 1 is a schematic diagram of a hot spot detection system designed in accordance with the present invention.

As best illustrated in FIG. 1, the signal indicative of the temperature of heat absorbent material 18 of rotor 14 in the region where the infrared radiation originated is provided to integrator 44 and may pass through intermediate steps of amplification in preamplifier 40 and conversion in converter 42. The signal produced by sensor 32 is proportional to the infrared radiation incident thereon and varies in amplitude as rotor 14 rotates past sensor 32. A typical infrared detector signal is shown in FIG. 1.

Preamplifier 40, located near sensor 32, receives the infrared sensor signal and amplifies the signal by a predetermined gain, typically 25, to provide a signal of sufficient amplitude for signal processing. A typical preamplifier output signal is shown in FIG. 1.

Converter 42 receives the floating AC signal output from preamplifier 40 and converts the floating AC signal into a 0-20 milliamp signal. The output current signal is proportional in magnitude to the input signal, peak to peak, and may be inverted. The converter output is a signal representing the instantaneous rotor temperature as sensed by the associated infrared sensor 32. A typical instantaneous rotor temperature is shown in FIG. 1.

The instantaneous rotor temperature signal provides the input to integrator 44. Integrator 44 integrates the instantaneous rotor temperature signal over a time period equal to one revolution of rotor 14 of air preheater 10 and divides the integrated result by the time period received from rotor drive control circuit 68 to obtain a signal representative of the average temperature of the rotor over the last period. The average rotor temperature is updated each time period; a typical average rotor temperature is shown in FIG. 1. In a preferred embodiment, integrator 44 is an analog integrator.

The difference between the instantaneous rotor temperature and the average rotor temperature is evaluated by summer 46. The output from summer 46 is a signal representative of the difference between the instantaneous rotor temperature and the average rotor temperature. A typical temperature difference signal is shown in FIG. 1.

The temperature difference from summer 46 provides the input to integrator 48. Integrator 48 computes the average value of the positive portion of the temperature difference signal by integrating the temperature difference signal and dividing the integrated sum by the time period received from rotor drive control circuit 68 resulting in a tracking trip level signal. In a preferred embodiment integrator 48 is an analog integrator. Integrator 48 is synchronized with integrator 44 in that both integrator 44 and integrator 48 receive the period of the rotor, that is the time for the rotor to make one revolution, from rotor drive control circuit 68. This assures that the average values calculated by integrator 44 and integrator 48 are computed over the same time period. A typical tracking trip level signal is shown in FIG. 1.

The tracking trip level signal generated by integrator 48 is added to an adjustable, predetermined trip level set point 50 in summer 52 producing a variable trip level signal. A typical variable trip level signal is shown in FIG. 1 and also in FIG. 5. The variable trip level signal so generated is compared in peak detecting comparator 54 to the difference between the instantaneous rotor temperature signal and the average rotor temperature signal generated by summer 46. If the instantaneous minus the average rotor temperature exceeds the variable trip level signal the scan motor 58 is de-energized by drive control circuit 56. De-energizing scan motor 58 maintains sensor 32 in a radially stationary position with respect to rotor 14. With scan motor 58 de-energized sensor 32 will scan substantially the same annular region of the face of rotor 14 as rotor 14 continues to rotate. In this manner sensor 32 monitors the infrared radiation of the same annular region of the end face of rotor 14 to detect, within approximately the next one and one-half revolutions of rotor 14, on the next subsequent revolution of rotor 14 the same hot spot as initially detected. When the instantaneous minus the average rotor temperature signal exceeds the variable trip level signal a second time within approximately one and one-half revolutions of rotor 14, that is within approximately one and one-half time periods, the same hot spot is detected on two successive passes of rotor 14 past sensor 32 and hot spot alarm 60 is energized.

If within approximately one and one-half revolutions of rotor 14 subsequent to an initial hot spot detection, a second detection of an elevated temperature in the same region of rotor 14 is not detected, drive control circuit 56 reenergizes scan motor 58 so that sensor 32 continues to scan the face of rotor 14 for hot spots.

The peak detecting comparator 54 may have two other time delays to ensure reliable operation. A first time delay would prevent short duration signals from activating the hot spot alarm 60 or drive control circuit 56. This feature eleminates electrical noise or minute hot spots from causing false alarms. A second time delay would preclude the first hot spot from immediately activating the alarm 60.

The average rotor temperature output signal from integrator 44 is compared in comparator 62 to an adjustable predetermined low temperature alarm set point 64. If the average temperature signal becomes less than the predetermined low temperature alarm set point 64, a low temperature alarm 66 is activated. The low temperature alarm indicates that air preheater 10 is starting up and the average temperature of the rotor is less than the low temperature alarm set point, or it may indicate a problem such as a sensor lens is dirty, or that cold end element plugging is blocking the infrared radiation from rotor 14 or that there may be a problem with the signal processing electronics.

Figure 5:
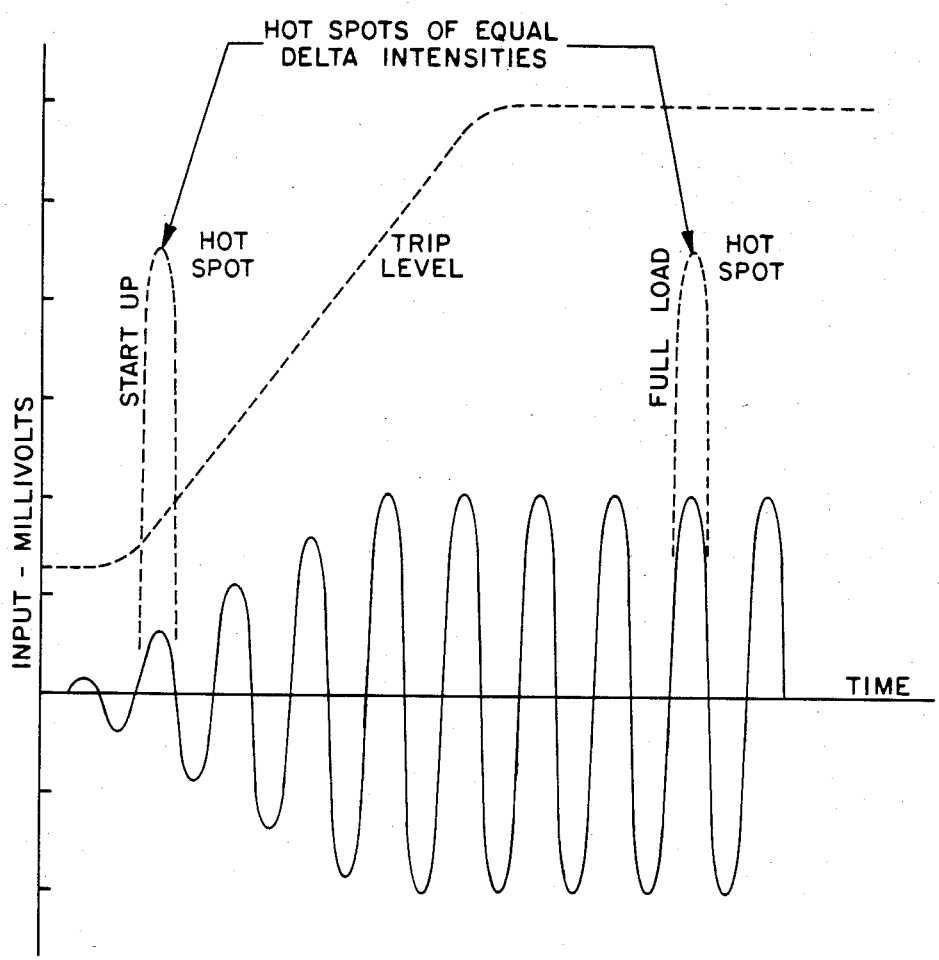
FIG. 5 shows the variable trip level signal and a typical sensor signal during a cold start-up and into steady state operation of a rotary regenerative air heater.

FIG. 5 shows how the variable trip level signal changes over time during a cold start-up of a typical air preheater 10. The variable trip level signal is comprised of a fixed component in adjustable predetermined trip level set point 50 and a variable component in the tracking trip level signal which is the output of integrator 48. The tracking trip level signal represents how the background temperature of rotor 14 changes over time. For example, on a start-up the temperature of rotor 14 gradually increases leveling off at a steady state temperature and the corresponding tracking trip level signal increases thence levels off. During a shut-down, the temperature of rotor 14 decreases and the tracking trip level signal concomitantly decreases.

Also shown in FIG. 5 is a typical infrared sensor output as preamplified by preamplifier 40 and converted by convertor 42 in accordance with the above description. As rotor 14 rotates past sensor 32 an uneven temperature is detected by sensor 32 due to the structure of rotor 14. The frequency of the temperature signal may range from one-half hertz to 3.5 hertz depending upon the speed of rotation and design of rotor 14.

Since the signal processing of each infrared sensor 32 is accomplished independent of other sensors in the hot spot detection system, only a single circuit has been shown in FIG. 1. Other signal processing circuits process signals from associated sensors in a substantially similar manner. In infrared detection systems designed with a single scan motor 58 the signals inputted to drive control circuit 56 may pass through an or gate such that any sensor 32 detecting a hot spot could cause scan motor 58 to cease scanning.

We claim:

1. Apparatus for detecting a hot spot in a rotary regenerative heat exchanger, comprising:
  a housing having an inlet and outlet ducts for a heating fluid and a fluid to be heated;
  a cylindrical rotor of heat absorbent material in said housing mounted for rotation about the central axis of the rotor;
  means for rotating the rotor to alternately subject the heat absorbent material thereof to the heating fluid and to the fluid to be heated;
  infrared ray detecting means including a sensor confronting the heat absorbent material of the rotor for receiving infrared radiation thereon and for generating a signal proportional to the infrared radiation incident thereon that is indicative of the instantaneous rotor temperature;
  means for moving the detecting means along a path in a plane parallel to and adjacent the end of the rotor;
  a first circuit means for receiving the sensor signal indicative of the instantaneous temperature of the rotor, for integrating the sensor signal over a time period and for dividing the integrated result by the time period of integration to produce an average rotor temperature signal;
  means for evaluating the temperature difference between the instantaneous temperature of the rotor and the average temperature of the rotor and for producing as an output the difference therebetween, the means for evaluating the difference having a first input port for receiving the instantaneous rotor temperature signal, a second input port for receiving the average rotor temperature signal and an output port at which the signal representing difference in temperature is presented;
  a second circuit means for receiving the temperature difference output from the difference means and for computing the average value of the positive portion of the temperature difference by integrating the temperature difference signal over a time period and for dividing the integrated result by the time period of integration to produce a tracking trip level signal;
  summing means for adding the tracking trip level signal to a predetermined trip level set point and for producing as an output a variable trip level signal representative of a variable threshold temperature, the summing means having a first input port for receiving the tracking trip level signal, a second input port for receiving the trip level set point, and an output port at which the variable trip level signal is presented;
  means for comparing the temperature difference signal output from the difference means to the variable threshold temperature, the comparing means having a first input port for receiving the temperature difference signal, a second input port for receiving the variable trip level signal and an output port at which the compared temperature signal is presented; and
  means responsive to the compared temperature signal for de-energizing the means for moving the detecting means upon the temperature difference signal exceeding the variable trip level signal.

2. Apparatus as recited in claim 1 wherein the period of integration of the first circuit means is synchronized with the period of integration of the second circuit means, whereby the average values computed by the first and second circuit means are computed over the same period.

3. Apparatus as recited in claim 1 wherein the first circuit means is an analog integrator.

4. Apparatus as recited in claim 1 wherein the second circuit means is an analog integrator.

5. Apparatus as recited in claim 1 wherein the predetermined trip level set point is adjustable.

6. Apparatus as recited in claim 1 further comprising:
means for comparing the average rotor temperature to a predetermined low temperature set point, the comparing means having a first input port for receiving the average rotor temperature signal, a second input port for receiving the predetermined low temperature set point and an output port at which the compared low temperature signal is presented; and
means responsive to the compared low temperature signal for energizing an alarm upon detecting the average rotor temperature is less than the predetermined low temperature set point.

7. Apparatus as recited in claim 6 wherein the predetermined low temperature set point is adjustable.

8. Apparatus as recited in claim 1 further comprising a preamplifier interposed between the infrared ray detecting means and the first circuit to amplify the instantaneous rotor temperature signal generated by the infrared ray detecting means to be of sufficient magnitude for signal processing.

9. Apparatus as recited in claim 8 further comprising a converter interposed between the preamplifier and the first circuit to convert the signal received from the preamplifier into a current signal.

10. Apparatus for detecting a hot spot in a rotary regenerative heat exchanger, comprising:
a housing having an inlet and outlet ducts for a heating fluid and a fluid to be heated;
a cylindrical rotor of heat absorbent material in said housing mounted for rotation about the central axis of the rotor;
means for rotating the rotor to alternately subject the heat absorbent material thereof to the heating fluid and to the fluid to be heated;
infrared ray detecting means including a sensor confronting the heat absorbent material of the rotor for receiving infrared radiation thereon and for generating a signal proportional to the infrared radiation incident thereon that is indicative of instantaenous rotor temperature;
means for moving the detecting means along a path in a plane parallel to and adjacent the end of the rotor;
a first circuit means for receiving the sensor signal indicative of the instantaneous temperature of the rotor, for integrating the sensor signal over a time period and for dividing the integrated result by the time period of integration to produce an average rotor temperature signal;
means for evaluating the temperature difference between the instantaneous temperature of the rotor and the average temperature of the rotor and for producing as an output the difference therebetween, the means for evaluating the difference having a first input port for receiving the instantaneous rotor temperature signal, a second input port for receiving the average rotor temperature signal and an output port at which the signal representing difference in temperature is presented;
a second circuit means for receiving the temperature difference output from the difference means and for computing the average value of the positive portion of the temperature difference by integrating the temperature difference signal over a time period and for dividing the integrated result by the time period of integration to produce a tracking trip level signal;
summing means for adding the tracking trip level signal to a predetermined trip level set point and for producing as an output a variable trip level signal representative of a variable threshold temperature, the summing means having a first input port for receiving the tracking trip level signal, the second input port for receiving the trip level set point, and an output port at which the variable trip level signal is presented;
a peak detector comparing means for comparing the temperature difference output from the difference means to the variable threshold temperature, the peak detector comparing means having a first input port for receiving the temperature difference signal, a second input port for receiving the variable trip level signal, a first output port at which the compared temperature signal is presented, and a second output port which is energized when the temperature difference signal exceeds the variable trip level signal a second time in approximately 1.5 time periods, whereby the same hot spot is detected on two successive passes of the rotor past the infrared ray detecting means; and
means responsive to the compared temperature signal presented at the first output port of the peak detector comparing means for terminating moving the detecting means adjacent the end of the rotor upon the temperature difference signal exceeding the variable trip level signal.

11. Apparatus as recited in claim 10 wherein the means responsive to the compared temperature signal presented at the first output port of the peak detector comparing means further comprises means for resuming moving the detecting means adjacent the end of the rotor upon the temperature difference signal not exceeding the variable trip level signal a second time in approximately 1.5 time periods.

12. Apparatus as recited in claim 10 further comprising means responsive to the second outlet port of the peak detector comparing means for energizing a hot spot alarm when the second outlet port is energized.

13. Apparatus as recited in claim 10 wherein the period of integration of the first circuit means is synchronized with the period of integration of the second circuit means, whereby the average values computed by the first and second circuit means are computed over the same period.

14. Apparatus as recited in claim 10 wherein the first circuit means is an analog integrator.

15. Apparatus as recited in claim 10 wherein the second circuit means is an analog integrator.

16. Apparatus as recited in claim 10 wherein the predetermined trip level set point is adjustable.

17. Apparatus as recited in claim 10 further comprising:
means for comparing the average rotor temperature to a predetermined low temperature set point, the comparing means having a first input port for receiving the average rotor temperature signal, a second input port for receiving the predetermined low temperature set point and an output port at which the compared low temperature signal is presented; and
means responsive to the compared low temperature signal for energizing an alarm upon detecting the average rotor temperature is less than the predetermined low temperature set point.

18. Apparatus as recited in claim 10 wherein the predetermined low temperature set point is adjustable.

19. Apparatus as recited in claim 10 further comprising a preamplifier interposed between the infrared ray detecting means and the first circuit means to amplify the instantaneous rotor temperature signal generated by the infrared ray detecting means to be of sufficient magnitude for signal processing.

20. A method of detecting a hot spot in a rotary regenerative heat exchanger having a housing surrounding a cylindrical rotor of heat absorbent material, the rotor mounted for rotation about the central axis thereof and driven by a rotation means to alternately subject the heat absorbent material to the heating fluid and to the fluid to be heated, the method comprising the steps of:

scanning the end of the rotor with a temperature measuring means;

measuring the instantaneous temperature of the rotor;

calculating the average rotor temperature over one period;

evaluating the temperature difference between the instantaneous rotor temperature and the average rotor temperature;

calculating as a trip level temperature the average value of the positive portion of the temperature difference;

comparing the temperature difference to the trip level temperature; and ceasing scanning of the end of the rotor upon the average rotor temperature exceeding the trip level temperature.

21. A method of detecting a hot spot as recited in claim 20, further comprising restarting the scanning of the end of the rotor upon the temperature difference not exceeding the trip level signal a second time in approximately 1.5 time periods.

22. A method of detecting a hot spot as recited in claim 20, further comprising energizing an alarm upon the temperature difference exceeding the trip level temperature a second time in approximately 1.5 time periods.

23. A method of detecting a hot spot as recited in claim 20, further comprising adding a predetermined trip level set point to the trip level temperature prior to comparing the temperature difference to the trip level temperature.

24. A method of detecting a hot spot as recited in claim 20, further comprising:

comparing the average rotor temperature to a low temperature set point; and energizing an alarm upon the average rotor temperature decreasing below the low temperature set point.

25. A method of detecting a hot spot as recited in claim 20, wherein a time period is one revolution of the rotor.

* * * * *